Dec. 22, 1970    F. J. JORDAN ET AL    3,548,490
MANUFACTURE OF THERMOCOUPLES
Filed Nov. 18, 1968
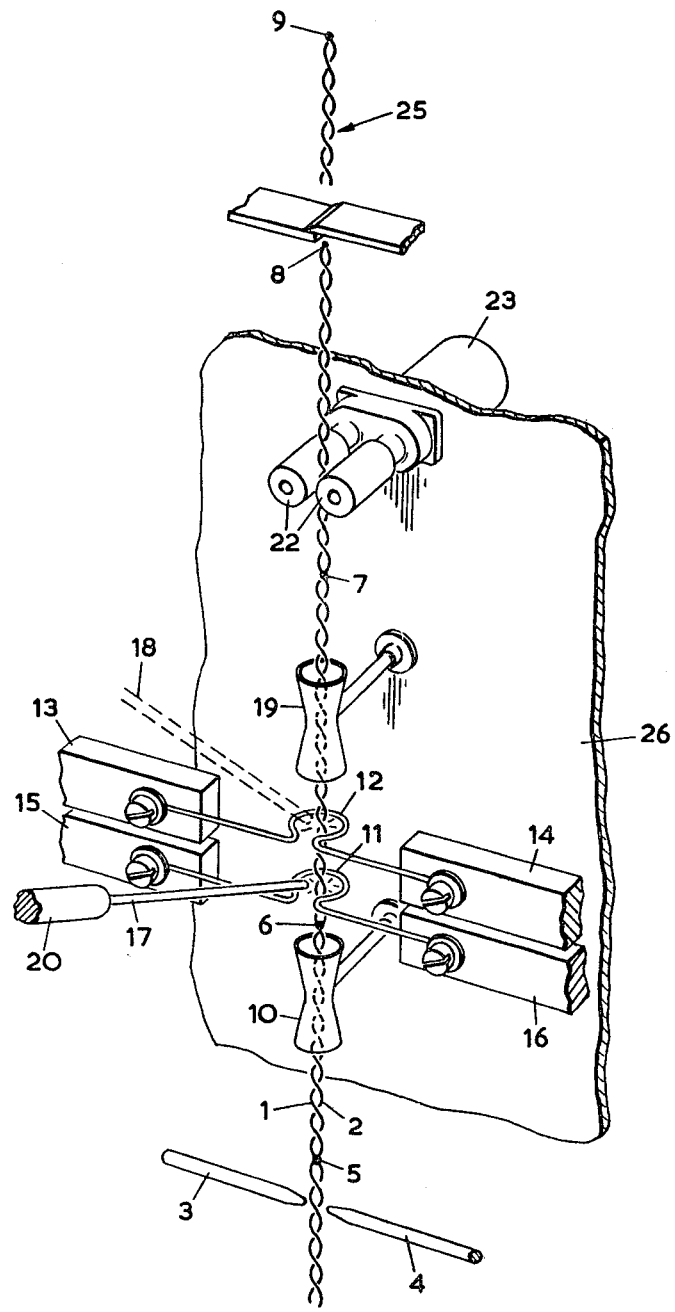
FREDERICK J. JORDAN
SIDNEY T. WELLS
INVENTORS
BY
*Stevens, Davis, Miller & Mosher*
ATTORNEYS United States Patent Office 3,548,490
Patented Dec. 22, 1970

3,548,490
MANUFACTURE OF THERMOCOUPLES
Frederick James Jordan and Sydney Tom Wells, Stafford, England, assignors to The English Electric Company Limited, London, England, a British company
Filed Nov. 18, 1968, Ser. No. 776,737
Claims priority, application Great Britain, Nov. 30, 1967, 54,659/67
Int. Cl. H01l 15/00
U.S. Cl. 29—573           5 Claims

ABSTRACT OF THE DISCLOSURE

In a method of continuously producing thermocouples coated with glass or glass-ceramic, a pair of thermocouple wires pass between spot welding electrodes, which form junctions at intervals equal to the length of thermocouples required. The wires then pass through one or more molten glass beads and the resultant coating is heat treated if necessary. The wires are then severed adjacent each junction to form separate thermocouples.

---

This invention relates to methods and apparatus for making thermocouples.

According to the invention in one aspect, a method of making a succession of thermocouples includes the steps of forming a series of spaced-apart welded junctions between a pair of elongate elements of dissimilar metallic compositions, passing said elements through at least one molten glass bead so as to coat them with molten glass, causing said glass to solidify, and cutting the elements at a point immediately adjacent each said junction.

The glass may be a devitrifiable glass, the method then including the step of heating the molten glass coating to devitrify the glass before it is allowed to solidify.

Preferably, the elements are passed through a plurality of said beads of molten glass, the first of which is fed continuously with glass from an external source, the remainder of said beads being continuously fed with glass carried along by the elements from the preceding bead.

The elements are preferably twisted together.

According to the invention in another aspect, apparatus for use in making a succession of thermocouples includes welding means for forming a series of spaced-apart welded junctions between a pair of elongate elements, at least one bead-supporting means adapted to support a molten glass bead, means for heating said bead-supporting means to the fusion temperature of glass, cutting means for cutting said elements immediately adjacent each said junction, and traction means for drawing said elements together through, in succession, the welding means, bead-supporting means and cutting means, the arrangement being such as to allow molten glass on the elements to solidify between the bead-supporting means and the cutting means.

A thermocouple having a glass insulating coating, and made by a method according to the invention, is included in the scope of the invention.

One embodiment of the invention will now be described, by way of example, with reference to the accompanying drawing which shows, schematically, one apparatus for manufacturing thermocouples.

In the drawing, two elongate thermoelectric elements 1 and 2 formed of dissimilar metals, such as a nickel-chromium alloy and a nickel-aluminium alloy, which together exhibit thermoelectric properties, are cleaned and their surfaces are prepared as necessary to allow glass or glass-ceramic to adhere thereto. The surface preparation depends on the materials of the elements, but thorough degreasing is usually necessary. For coating elements made from readily oxidisable materials a protective inert or reducing atmosphere may be provided to prevent oxidation of the material, but in certain cases controlled oxidation is necessary or desirable before coating.

The elements 1 and 2, which may be for example in the form of wires, are fed from spools or other containers (not shown) and are loosely twisted together. They are then fed between the electrodes or jaws 3 and 4 of a welding device which spotwelds the elements 1 and 2 together at intervals equal to the lengths of thermocouple required, to form a succession of spaced-apart junctions, such as junctions 5 to 9.

The elements 1 and 2 then continue under the control of a guide 10 which may be in the form of a tapered glass tube, a pulley wheel, or other suitable low friction device. The guide 10 must be such as not to contaminate the elements 1 and 2.

The elements 1 and 2 then pass upwards, through a pair of open-sided loops 11 and 12, each of which is connected at its ends to a pair of bus bars 13, 14, and 15, 16, respectively, which are connected to a power supply (not shown) which passes a current through each loop 11, 12. Alternatively, the loops 11 and 12 may be connected in any other suitable manner to the power supply. Each loop 11 and 12 is made of a refractory metal wire of, for example, platinum, which is heated by the current to a sufficient temperature to melt the tip of a glass rod 17 which is fed on to the loop 11 by a suitable feeding device 20. The molten glass forms into a bead within the loop 11 under the control of surface tension. The rod 17 melts rapidly when fed on to the loop 11 and the rate of feeding of the rod 17 by the feeding device 20 must be such as to maintain the bead of molten glass on the loop 11. A bead of molten glass is also established on the loop 12, by initially feeding a rod 18 on to the loop 12 and then removing the rod 18 when the bead is formed. This bead is then replenished by glass which originates in the bead on the loop 11 and is carried up to the loop 12 by the elements 1 and 2.

As the elements 1 and 2 pass slowly through the loops 11 and 12, a molten glass coating is deposited over the elements. The coating then solidifies by cooling, so that the elements 1 and 2 are then insulated from each other except at the junctions 5 to 9. The coated elements 1 and 2 then pass a second guide 19, which may be similar to the guide 10 and which must be such as not to crack or abrade the coating. The elements 1 and 2 are drawn upwards through the loops 11 and 12 by a pair of resilient rollers 22 or by other suitable traction means. The rollers 22 are driven by a motor 23 which is mounted on a base plate 26 which also holds the guides 10 and 19.

After passing through the rollers 22, the elements 1 and 2 are guided (by means not shown) between the blades of a shearing device 24 which severs the elements 1 and 2 immediately adjacent each junction, to form a succession of individual thermocouples, such as a thermocouple 25. The glass coating on the thermocouples is suitable for withstanding high temperatures and fully insulates the thermocouples throughout their length, except adjacent the junctions where the elements 1 and 2 have been severed after coating. If necessary, this area may also be insulated by dipping the severed end into molten glass similar to that used in the coating process.

Merely as an example of the use of the apparatus, details of materials and dimensions which have been used in the manufacture of thermocouples by a process according to the invention are given below, but these are not to be taken as constituting any limitation to the invention. The elements 1 and 2 were wires of 0.17 mm. diameter and were formed of an alloy comprising approximately 90% nickel and 10% chromium, and an alloy comprising approximately 98% nickel and 2% aluminium, respectively. Each loop 11 and 12 had an inside diameter of 5 mm. and was formed of 7-strand platinum wire 0.75 mm. diameter. Each loop was heated to approximately 1100° C. by passing a current of 72 amps through it with an applied voltage of 1½ volts.

It has been found advantageous to use open-sided loops for coating fine wire elements so that the elements can be introduced into the loops when in motion. However, for elements of larger cross-section a loop or frame completely encircling the elements may be used.

After cooling, the coating on the elements 1 and 2 may be in the form of glass or of glass-ceramic (devitrified glass), depending upon the composition of the molten glass and upon its heat treatment after application to the elements 1 and 2. Means such as a furnace (not shown) may be provided for applying suitable heat treatment to the coating. The use of two adjacent coating loops rather than a single loop has been described above because this has been found advantageous for the following reasons. If the coating after solidification is to be of glass-ceramic and a single loop is used, difficulty is experienced in replenishing the bead with the glass rod 17 without cooling the bead to such an extent that premature devitrification of the coating occurs, whereas if two loops and beads are used, the bead in the loop 11 can be replenished using the rod 17 whilst the bead in the loop 12 is maintained by the glass transferred to it from the first bead by adhesion to the moving elements 1 and 2. Furthermore, in an alternative arrangement in which the rod 18 is continuously fed to the loop 12 by a further feeding device (not shown), the use of two loops 11 and 12 is equivalent to passing the elements 1 and 2 twice through a single loop. This is advantageous if it is found that a single pass results in a coating having points of low dielectric strength. A single loop and bead may, however, still be used in applications in which there would be no adverse effects from replenishing the single loop with a glass rod and in which the improved coating provided by two passes of the elements through coating loops is unnecessary.

Instead of using one or more loops, each loop may be replaced by two separate electrodes which maintain the glass in the molten condition by passing a current through the glass.

Although the junctions 5 to 9 in the above embodiment are formed by spot-welding together the elements 1 and 2 before coating the elements, other suitable methods of forming the junctions might be used, for example other welding methods. In some circumstances, the junctions 5 to 9 might be formed after the elements 1 and 2 have been coated. The elements 1 and 2 may not need to be twisted together. It may be found possible to manufacture thermocouples by the above method with the elements 1 and 2 lying parallel to one another.

Clearly, thermocouples having thermoelectric elements 1 and 2 formed of other dissimilar materials, could be manufactured by the method described above.

Although the guides 10 and 19, the loops 11 and 12, the rollers 22, etc., are shown in the drawing as extending in a straight line upwards, clearly other configurations and other directions of travel of the elements 1 and 2 could be used.

We claim:
1. A method of making a succession of thermocouples, including the steps of forming a series of spaced-apart welded junctions between a pair of elongate elements of dissimilar metallic compositions, passing said elements through at least one molten glass bead so as to coat them with molten glass, causing said glass to solidify, and cutting the elements at a point immediately adjacent each said junction.

2. A method according to claim 1, wherein said glass is a devitrifiable glass, including the step of heating the molten glass coating to devitrify the glass before it is allowed to solidify.

3. A method according to claim 1, wherein the elements are passed through a plurality of said beads of molten glass, the first of which is fed continuously with glass from an external source, the remainder of said beads being continuously fed with glass carried along by the elements from the preceding bead.

4. A method according to claim 1, wherein the elements are twisted together.

5. Apparatus for use in making a succession of thermocouples, including welding means for forming a series of spaced-apart welded junctions between a pair of elongate elements, at least one bead-supporting means adapted to support a molten glass bead, means for heating said bead-supporting means to the fusion temperature of glass, cutting means for cutting said elements immediately adjacent aech said junction, and traction means for drawing said elements together through, in succession, the welding means, bead-supporting means and cutting means, the arrangement being such as to allow molten glass on the elements to solidify between the bead-supporting means and the cutting means.

References Cited
UNITED STATES PATENTS 3,400,452    9/1968    Emley _____ 29—573
3,451,847    6/1969    Ashpole et al. _____ 65—59X TRAVIS S. McGEHEE, Primary Examiner U.S. Cl. X.R.
65—59